United States Patent [19]

Chase et al.

[11] Patent Number: 4,813,215

[45] Date of Patent: Mar. 21, 1989

[54] MOWER BELT TRANSMISSION WITH BLADE BRAKE

[75] Inventors: Alan L. Chase, Oostburg; Michael T. Prevost, Cedarburg, both of Wis.

[73] Assignee: Simplicity Manufacturing, Inc., Port Washington, Wis.

[21] Appl. No.: 47,718

[22] Filed: May 7, 1987

[51] Int. Cl.$^4$ .................. A01D 69/10; A01D 34/66
[52] U.S. Cl. ........................... 56/11.6; 56/11.3; 56/DIG. 22
[58] Field of Search ............... 56/11.3, 11.6, DIG. 22, 56/15.3, 12.7, 16.9

[56] References Cited

U.S. PATENT DOCUMENTS

| | | | |
|---|---|---|---|
| 2,732,676 | 1/1956 | Bernier | 56/11.3 |
| 3,367,459 | 2/1968 | Rubin | 56/11.3 |
| 4,068,452 | 1/1978 | Schaefer et al. | 56/11.6 |
| 4,102,114 | 7/1978 | Estes et al. | 56/DIG. 22 |
| 4,231,215 | 11/1980 | Klas | 56/11.6 |
| 4,285,419 | 8/1981 | Anderson | 56/11.3 |
| 4,408,683 | 10/1983 | Elmy et al. | 56/11.3 |
| 4,519,486 | 5/1985 | Hermanson | 56/11.3 |
| 4,551,967 | 11/1985 | Murcko | 56/11.6 |

*Primary Examiner*—Paul J. Hirsch

*Attorney, Agent, or Firm*—James E. Nilles

[57] ABSTRACT

A transmission for a multi-blade mower has a belt trained around a driving pulley and successively around driven pulleys for the blades. For driving, an idler pulley of a tensioner engages a portion of the belt that is "downstream" from the last driven pulley and "upstream" from the first one. When the tensioner idler is disengaged from the belt for slippage of the driving pulley relative to it, blade braking is effected by opposing stationary and movable brake members mounted at opposite sides of the belt at a normally straight stretch of it that is "downstream" from the tensioner and driving pulley and "upstream" from the first driven pulley, the movable brake member then cooperating with the stationary one to clampwise engage the belt and confine it in a groove in one of those members. Manual shifting of an actuator towards an "on" position tensions a spring that engages the tensioner with the belt, and such tension, through a toggle connection, tends to maintain the actuator in that position. The movable brake member is biased towards the stationary brake member but has a lost motion connection with the actuator whereby shifting of the latter to its "on" position moves the movable brake member away from the stationary one to release the belt.

5 Claims, 4 Drawing Sheets 4,813,215

MOWER BELT TRANSMISSION WITH BLADE BRAKE

FIELD OF THE INVENTION

This invention relates generally to power lawn mower belt transmissions, of the type having a belt tensioner whereby a driven pulley for a mower blade can be selectably clutch connected with a driving pulley or disconnected therefrom; and the invention is more specifically concerned with a blade brake in such a transmission whereby rotation of the mower blade is promptly arrested upon its being disconnected from the driving pulley.

BACKGROUND OF THE PRIOR ART

The industry concerned with power lawn mowers has long been aware of the hazards presented by a rapidly rotating mower blade and of the fact that mower blade accidents can result from failure to appreciate that the momentum of a mower blade tends to keep it in rotation for a substantial period of time after it is declutched from the engine that drives it.

Concern about this hazard has stimulated a constant and diligent search for safety measures that will eliminate mower blade accidents. A number of mower blade brakes have been devised, intended to arrest rotation of a mower blade promptly upon its being declutched from the prime mover that drives it.

U.S. Pat. No. 4,213,288 discloses a rotary mower that has a single blade which is driven through a belt transmission. A belt tightener is arranged to have its idler pulley engage the inside of the belt for tensioning around the driving and driven pulleys. The lever arm that carries the belt tensioning idler pulley also carries a friction pad. As the idler pulley is swung away from tensioning engagement with the belt, the friction pad comes into braking engagement with a portion of the driven pulley circumference that is between the belt stretches which extend to it. This arrangement, although simple, has the disadvantage that the belt tensioner, by reason of its engaging the inside of the belt, decreases the wrap of the belt around the driving and driven pulleys when it tensions the belt. The apparatus is also not well suited to a mower having more than one blade.

U.S. Pat. Nos. 4,186,545, 4,307,558 and 4,409,779 all disclose arrangements which are somewhat more complicated but wherein braking is likewise effected by friction against a driven pulley. These, too, are basically unsuitable for a mower having more than one blade.

U.S. Pat. Nos. 4,395,865 and 4,429,515 disclose a multiple-blade rotary mower having each of its laterally outermost blades mounted on a so-called wing which can be swung up to a position at right angles to the main central portion of the mower. Raising a wing slackens the belt that drives its blade, and belt slackening, in turn, allows a brake bar to be engaged under bias against rim portions of the driven pulley for the blade on that wing. Here, again, the braking system is effective for only one blade, and it is noteworthy that the patent discloses no provision for braking of the blades of the central portion of the mower when those blades are declutched from the prime mover.

U.S. Pat. No. 4,231,215 discloses a rotary mower having three blades. A drive belt trained around a driving pulley and a driven pulley for each blade is tensioned for power transmission by means of a generally conventional belt tensioner. When belt tension is relaxed to declutch the blades from the prime mover, a braking member is moved into engagement with the belt at its zone of engagement with the driven pulley for one of the blades, stopping coasting of the belt and, through the belt, braking the driven pulleys. Because the braking member presents a straight surface to the portion of the belt that it engages, whereas that portion of the belt is curved around a pulley, only relatively small surface areas of the belt and of the friction member are in contact with one another during braking, and therefore the belt is subjected to substantial wear at each braking operation if the brake apparatus is to be effective for rapidly decelerating all three blades A variant of the arrangement of U.S. Pat. No. 4,231,215 is disclosed in U.S. Pat. No. 4,068,452, which relates to a mower having only two blades. In this case the braking member comprises an elongated rod that is moved laterally for braking to bring its straight end portions into engagement with the belt at its zones of engagement with the driven pulleys for both blades. Although providing for substantially more surface area engagement than the apparatus in which the belt is contacted at only one pulley, the arrangement of U.S. Pat. No. 4,068,452 is suitable only for a mower having only two blades.

U.S. Pat. No. 4,551,967 discloses a machine wherein a rotary blade is driven through a belt transmission and wherein the blade, upon its being declutched from the prime mover, is braked by means of a stationary braking element having a V-groove into which the belt is forced laterally by a braking roller. The braking roller is mounted on the end of a lever arm that is biased to swing that roller towards the braking element and into engagement with the belt. The carrier for the belt tensioning idler pulley has a cam connection with the braking roller arm whereby that arm is swung away from the belt when the idler pulley is shifted to its position for tensioning of the belt, and by such shifting the tensioning idler displaces the belt laterally out of the V-groove in the braking element. The tensioner can perform this function because its idler pulley engages the inside of the belt and thus decreases the wrap of the belt around the driving pulley as the belt is tensioned. Furthermore, the tensioner idler pulley engages a portion of the belt that is directly "downstream" from the brake element, and therefore the belt remains in tensioned engagement with that idler during braking. To accommodate these conditions the tensioner is biased to a defined belt relaxing position, and it is drawn to its tensioning position by the operator, who is thus compelled to judge the amount of tension that should be applied to the belt. If the operator exerts too much strength in drawing the tensioner to its tensioning position, the belt may be stretched excessively, whereas insufficient tensioning of the belt permits slippage at the driving pulley. In principle, very satisfactory blade braking can be effected by forcing the belt into a V-groove in a stationary braking member, but the particular braking arrangement disclosed in this patent—which is intended for braking a single edger blade that rotates on a horizontal axis—is not well suited for a multi-blade mower transmission and is in any case relatively complicated and expensive.

SUMMARY OF THE INVENTION

The general object of this invention is to provide a power mower belt transmission which does not have any of the disadvantages of the prior transmissions and which, more specifically, comprises a belt tensioner that engages the outside of the belt under a predetermined biasing force when in its operative position, and further comprises very simple and inexpensive braking means whereby effective mower blade braking is achieved promptly upon shifting of the belt tensioner out of its operative position, said braking means providing for frictional engagement between substantially large surface areas of the belt and a stationary braking element to minimize wear on the belt during braking.

Thus, it is a more specific object of this invention to provide a power mower belt transmission that is suitable for a mower having any number of blades, but especially for a mower having a plurality of blades, and having an actuator which can be manually and selectably shifted to an "on" position wherein a belt tensioner engages the outside of the belt under a predetermined biasing force and to an "off" position wherein the belt tensioner permits the belt to slacken for uncoupling the blades from a prime mover, said transmission having braking means automatically operative to effect prompt arrest of rotor blade rotation upon shifting of the actuator to its "off" position.

Another specific object of the invention is to provide a transmission of the character described having an actuator that is manually shiftable between "on" and "off" positions, a belt tensioner that engages the belt under the biasing force of a tensioning spring when the actuator is in its "on" position, and a movable braking element that is at all times biased towards the belt by a braking spring and engages the belt for arresting blade rotation when the actuator is shifted to its "off" position, said transmission being so arranged that the respective biasing forces exerted by said tensioning spring and said braking spring do not oppose one another notwithstanding that they are operative in opposite positions of the actuator.

Another and very important object of the invention is to provide braking means for a mower transmission of the character described, comprising a simple stationary braking member that can be inexpensively formed in one piece, as by stamping, and a cooperating movable braking member that is adapted to be bent from a single piece of stiff wire or rod stock and is thus likewise capable of being produced easily and at low cost.

These and other objects of the invention that will appear as the description proceeds are achieved in a power lawn mower transmission which incorporates the braking means of this invention and which is of the type that comprises a powered driving pulley, a driven pulley with which a blade is constrained to rotate, supporting means on which those pulleys are confined to rotation at a substantially fixed distance from one another, an endless belt trained around said pulleys and having a laterally tapering inner side that engages said pulleys and an opposite outer side, and a belt tensioner comprising an idler pulley and means comprising a manually operable actuator for shifting said idler pulley in opposite directions to an operative position wherein the idler pulley engages the outer side of the belt to tension it for driving and to an inoperative position wherein the idler pulley is disengaged from the belt for slippage of the driving pulley relative to it. The braking means of this invention, whereby rotation of the blade is arrested when the idler pulley is shifted to its inoperative position, is characterized by a stationary brake member which is mounted on said supporting means adjacent to a normally straight stretch of the belt that extends to the driven pulley and moves during driving in a direction away from the driving pulley and the idler pulley and towards the driven pulley. The stationary brake member is formed in one piece and has an elongated upper friction portion that is bent along its length to define a laterally opening groove in which the inner side of the belt is closely receivable. Said stationary brake member further has an upright supporting portion bent to have at a lower end thereof a laterally projecting foot portion that overlies and is secured to an upper surface on said supporting means and has an upper end connected with said upper friction portion for supporting the same at an elevation above said upper surface. The upper friction portion of the stationary brake member is disposed lengthwise parallel to said stretch of the belt at a small distance from the inner side thereof and with its groove opening towards it. A movable brake member is bent from a single piece of wire to have a substantially straight and horizontally extending bight portion, a pair of legs that are bent downward from opposite ends of said bight portion, and a pair of coaxial horizontally extending pivot portions, each extending laterally from a lower end of one of said legs. The device further comprises means confining said pivot portions of the movable brake member to rotation adjacent to said upper surface of the supporting means and disposing the movable brake member at the outer side of the belt for swinging between a releasing position spaced from said outer side of the belt and a braking position wherein the movable brake member engages the outer side of the belt and forces the belt laterally into said groove in the stationary brake member. A braking spring reacts between the supporting means and the movable brake member to bias the latter towards its braking position. A link or similar means provides a lost motion connection between the movable brake member and the actuator whereby shifting of the idler pulley to its operative position swings the movable brake member to its releasing position and shifting of the idler pulley to its inoperative position permits the movable brake member to swing to its braking position under the bias of said braking spring.

Other features of the invention will appear as the description proceeds.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Figure 1:
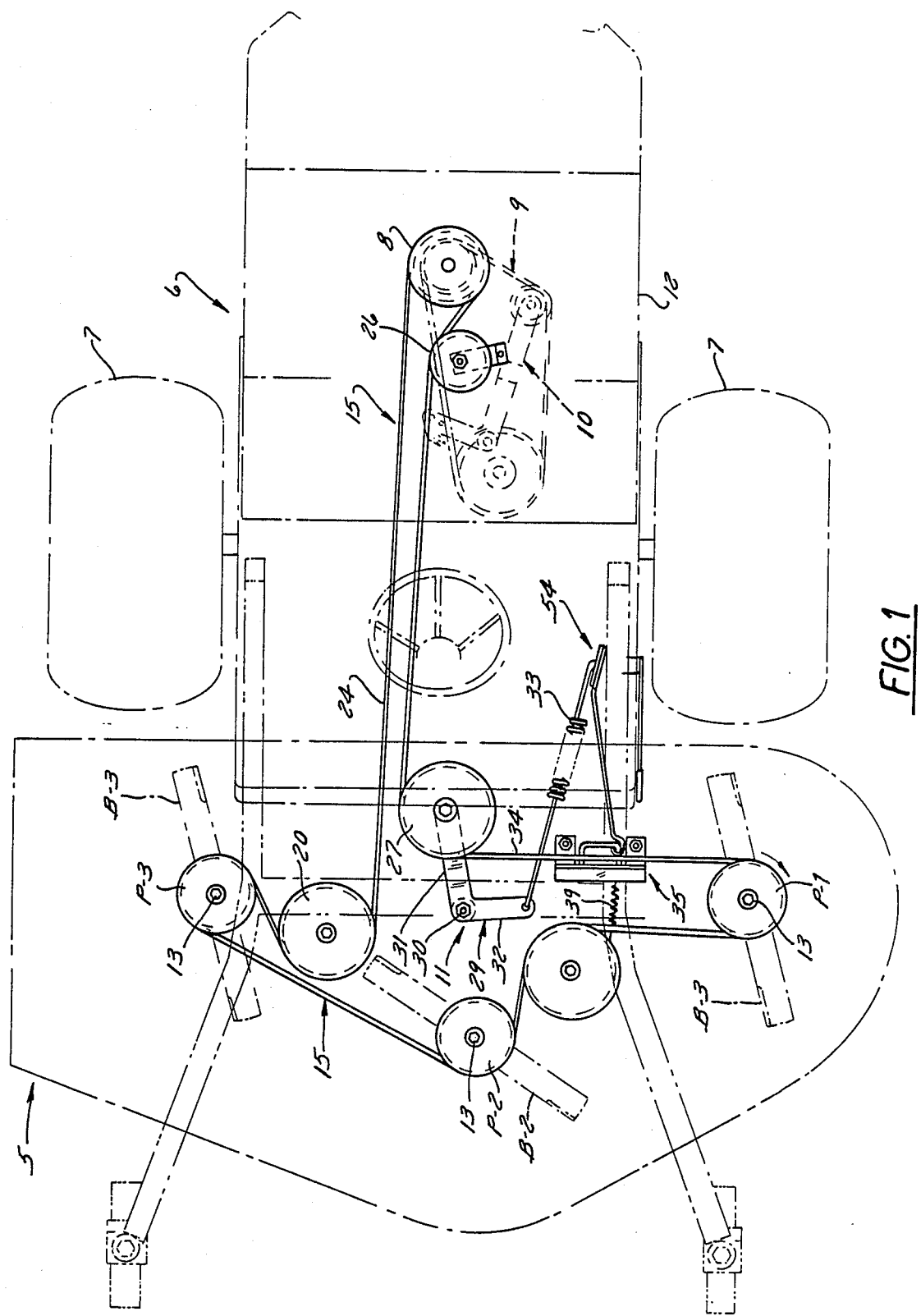
FIG. 1 is a plan view of a mower transmission embodying the principles of this invention, shown in its relation to a mower that has rotary blades driven from the transmission and a tractor or the like which carries the mower at its front and carries a powered driving pulley for the transmission.

Although the transmission of this invention is well suited for a mower having only one blade, its advantages are best understood in its cooperation with a mower having a plurality of blades, and therefore it is here illustrated in connection with a mower 5 that has three rotary blades B-1, B-2, B-3. By way of illustration, the mower 5 is shown as mounted on the front of a tractor or riding chassis 6 that has front traction wheels 7 and steerable rear wheels 3. The particular chassis 6 here illustrated is more fully disclosed in two copending applications, Ser. No. 047,870, filed May 7, 1987, and Ser. No. 047,931, filed May 7, 1987, both of which are assigned to the asignee of this application. As the description proceeds it will be seen that the principles of the mower transmission of this invention can be readily adapted to a so-called belly mounted mower that is carried at the underside of a riding chassis, between its front and rear wheels.

A prime mover E that drives the front traction wheels 7 as well as the mower blades B-1, B-2, B-3 is in this case mounted on the chassis 6 behind the front wheels, and therefore a driving pulley 8 that is secured to the bottom of the downwardly projecting output shaft of that prime mover is located at a substantial distance to the rear of the mower 5. The driving pulley 8 is here shown as a dual pulley comprising concentric upper and lower pulley elements for driving two belt transmissions. The belt transmission of this invention, through which the mower blades are powered, is driven from the lower element of the driving pulley 8. The upper element of the driving pulley drives a traction transmission which is more or less diagrammatically illustrated at 9 and through which the front wheels 7 are powered. The traction transmission can be conventional, but it preferably has its own belt tensioner 10 that is controlled separately from the mower transmission belt tensioner 11 described hereinafter, so that each of the transmissions can be engaged and disengaged independently of the other.

The mower transmission comprises a driven pulley P-1, P-2, P-3 for each of the respective mower blades B-1, B-2, B-3. As is conventional, each driven pulley is mounted above the top wall 12 of a skirted mower deck, and each blade is mounted beneath the deck and is constrained to rotate concentrically with its driven pulley by means of an upright shaft 13 which extends through that top wall and is rotatably journaled therein.

Figure 2:
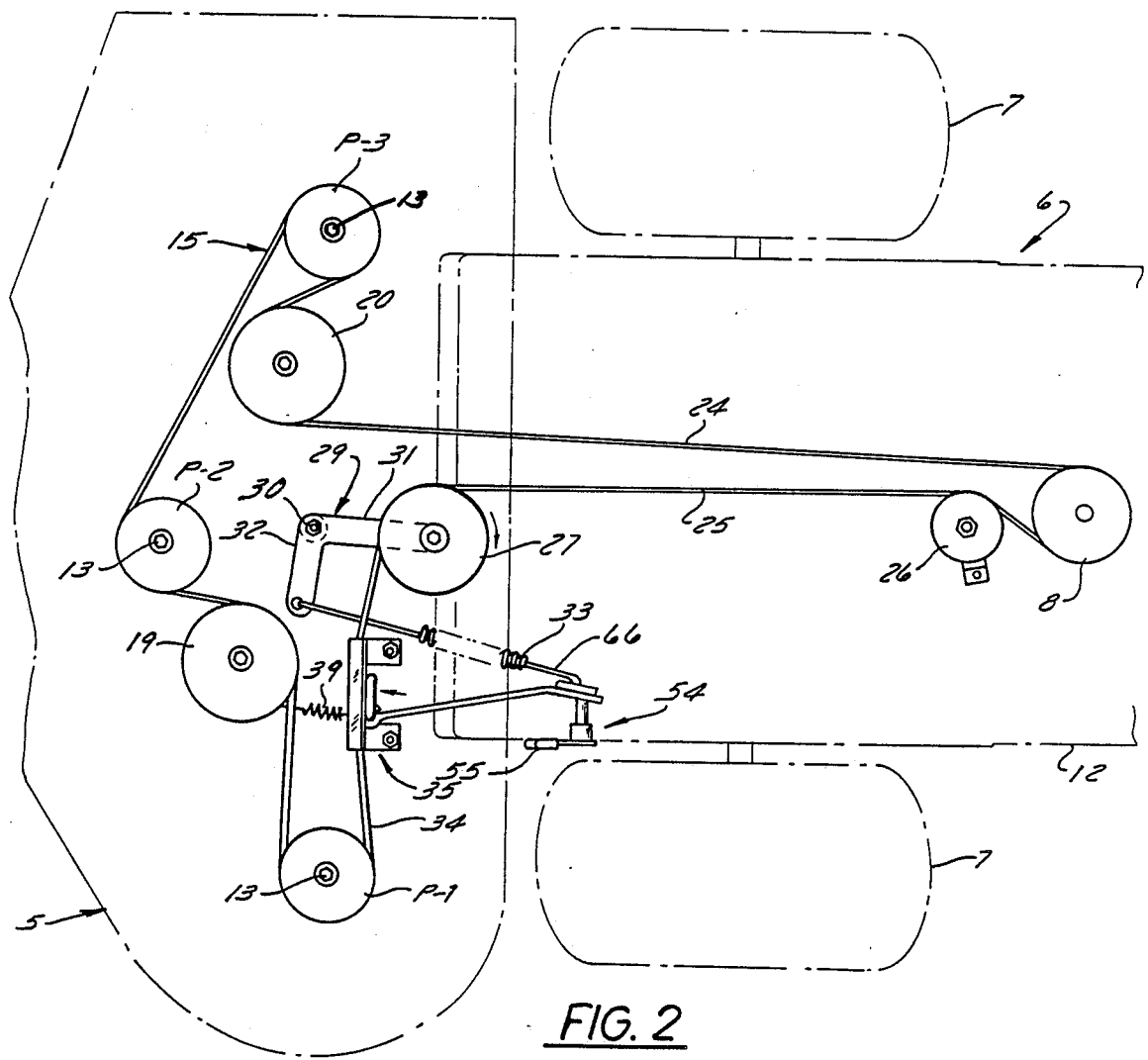
FIG. 2 is a view generally similar to FIG. 1 but showing the transmission in its declutched condition and with the blade brake engaged.

The mower transmission further comprises an endless belt 15 that is trained around the driving pulley 8 and the driven pulleys P-1, P-2, P-3. It will be understood that a more or less conventional hitch (not shown) so connects the mower 5 to the chassis 6 that each of the driven pulleys P-1, P-2, P-3 is maintained at a substantially fixed horizontal distance from the driving pulley 8 and at substantially the same elevation as the driving pulley, so that there are no twists or crossovers in the belt 15. The driven pulleys therefore rotate in the same direction as the driving pulley. As shown in FIGS. 1 and 2, the direction of rotation of the driving and driven pulleys is clockwise, and a point on the belt moves successively through engagement with the driving pulley 8, the outer driven pulley P-1, the middle driven pulley P-2, the other outer driven pulley P-3, and back to the driving pulley 8.

The belt 15 is of the so-called V-belt type, having a laterally tapering inner side 17 and an opposite outer side 18. The inner side 17 of the belt engages with the driving and driven pulleys, which have V-grooves that provide a good frictional connection with it.

Between the middle driven pulley P-2 and the first outer driven pulley P-1 there is a stationary idler pulley 19 that is mounted at a fixed location on top of the mower deck, with its axis near a line that connects the axes of those driven pulleys P-2 and P-1. The stationary idler pulley 19 engages the outer side 18 of the belt and causes the belt to engage each of the adjacent driven pulleys P-1, P-2 around a substantial portion of its circumference. A second stationary idler pulley 20 on the top of the mower deck, having its axis near a line connecting the axes of the driven pulleys P-2 and P-3, likewise engages the outer side 18 of the belt, at a portion of the belt that is "downstream" from the driven pulley P-3, for good wrap of the belt around that driven pulley. From the stationary idler 20 a relatively long stretch 24 of the belt extends rearward to the driving pulley 8. Another relatively long belt stretch 25 extends forward from the driving pulley 8 to a tensioning idler pulley 27 of the mower belt tensioner 11. In view of the length of the belt stretches 24, 25, consistent engagement of the belt with the driving pulley 8 is maintained by a third stationary idler pulley 26 which is mounted on the underside of the chassis, relatively close to the driving pulley, and which engages one of the stretches 24, 25 (here the stretch 25) at the outer side of the belt, to deflect the engaged stretch 25 towards the other one 24.

The belt tensioner 11 comprises a bent lever or bell crank 29 that is fulcrumed on a pivotal connection 30 to the mower deck. One arm 31 of the bell crank is a carrier for the tensioning idler pulley 27 and to its other arm 32 is connected a tensioning spring 33 which (as explained below) biases the tensioning idler 27 against the outer side 18 of the belt. In this case the tensioning idler 27, when engaged with the belt, defines the front end of the forwardly extending stretch 25, and the belt curves around that idler through about 90° to have a normally straight stretch 34 that extends sidewardly relative to the mower, from the tensioning idler to the first driven pulley P-1. Attention is directed to the fact that the belt, in its stretch 34, has its tapering inner side 17 towards the front of the mower.

The blade braking means 35 of this invention is mounted on the top of the mower deck for cooperation with the sidewardly extending stretch 34 of the belt. It comprises, in general, a stationary brake member 37 that is formed in one piece as a relatively simple stamping, a movable brake member 38 that is bent from a single piece of stiff wire or rod stock, and a biasing means in the form of a tension spring 39 by which the movable brake member is biased towards the stationary one for clampwise cooperation with it.

Figure 6:
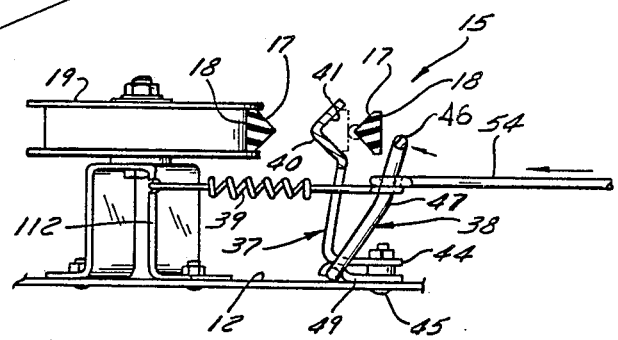
FIG. 6 is a fragmentary view of the blade braking means, partly in side elevation and partly in vertical section.
Figure 7:
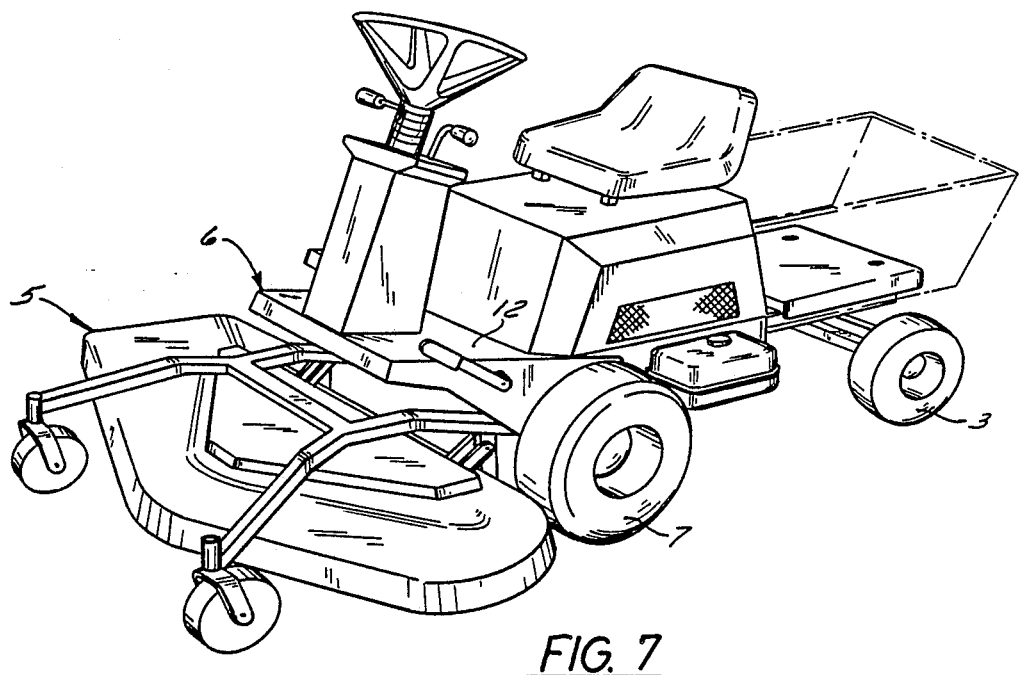
FIG. 7 is a perspective view of a riding mower embodying the present invention.

The stationary brake member 37 has an elongated upper friction portion 40 that is bent along its length to define a laterally opening groove 41 in which the inner side 17 of the belt is closely receivable. Thus, as best seen in FIG. 6, the inner or groove surface of the friction portion 40 has a cross-section profile which substantially mates with that of the inner side 17 of the belt so that when the belt is received in the groove there are substantial areas of friction contact between the belt and the stationary brake member 37. Below its upper friction portion and formed in one piece therewith the stationary brake member has an upright supporting portion 43 that is bent to have at its lower end a laterally projecting foot portion 44 which overlies the top surface of the mower deck and is secured thereto as by bolts 45. In this case the supporting portion 43 of the stationary brake member comprises two upright legs, one projecting down from each end of the friction portion 40, so that the stationary brake member as a whole is of inverted U-shape.

As mounted on the mower deck, the stationary brake member has its friction portion 40 lengthwise parallel to the stretch 34 of the belt. With the belt in its normally tensioned condition, the friction portion 40 is at the level of the belt stretch 34 and is spaced a small distance forwardly from the inner side of the belt. The groove 41 opens rearwardly towards that belt stretch.

The movable brake member 38 is bent to substantially an inverted U-shape to have a straight, horizontally extending belt engaging bight portion 46 and legs 47 that project downward from opposite ends of the belt engaging portion. Coaxial horizontally extending pivot portions 48 are bent from the bottom ends of the respective legs. These pivot portions 48 are confined to rotation against the top surface of the mower deck by means of clips 49 which overlie the mower deck and are secured to it by means of the same bolts 45 that secure the stationary brake member.

The movable brake member 38 is disposed at the rear of the belt stretch 34, at the opposite side of the belt from the stationary brake member 37, with its bight portion parallel to that belt stretch. Its pivot portions 48 enable it to swing forward and rearward, respectively, toward and from engagement with the outer side 18 of the belt.

When the belt tensioning idler pulley 27 is disengaged from the belt to permit belt slackening, the movable brake member 38 moves forward under the bias of the spring 39, engaging the outer side 18 of the belt and urging the belt forward into the groove 41 in the stationary brake member. Thus clampwise confined between the two brake members 37, 38, the belt is subjected to friction with both of them by which its motion tends to be arrested, and, in turn, friction between the belt and the driven pulleys P-1, P-2, P-3 quickly brakes rotation of the mower blades.

It will be observed that when the movable brake member moves to its operative position it displaces the belt laterally to a substantial extent, so that the otherwise straight stretch 34 is deflected to a shallow V. In its inoperative position, shown in full lines in FIG. 6, the movable brake member is spaced a small distance to the rear of the belt stretch 34. Hence, upon return of the movable brake member to its inoperative position, tensioning of the belt straightens its stretch 34, thus drawing the belt laterally out of the groove 41 in the stationary brake member.

The tension spring 39 by which the movable brake member 38 is at all times biased forward towards the stationary brake member has a rear end formed as a loop 52 that embraces one leg 47 of the movable brake member and has a front end formed as a hook 53 that is connected to a pedestal support 112 which is fixed to the mower deck 12 and on which the first stationary idler pulley 19 is mounted for rotation. For drawing the movable brake member 38 rearward to its inoperative position, a lost motion link 54 is connected to one leg 47 of that brake member and extends rearward therefrom to an actuator described hereinafter.

When the braking means 35 is engaged with the belt, the momentum of the rotating blades, acting through friction between the belt and the driven pulleys, tends to maintain tension in the part of the belt that extends from the braking means through engagement with all three driven pulleys P-1, P-2, P-3; and therefore the tension in this part of the belt, and hence the friction between it and the driven pulleys, tends to be proportional to the speed of blade rotation, so that blade braking is very prompt and effective. To ensure this relationship between blade momentum and braking force, the braking means 35 must be located for engagement with a portion of the belt which, during driving, moves away from both the driving pulley 8 and the tensioning idler pulley 27 and towards the first driven pulley P-1, and the tensioning idler 27 must engage a portion of the belt that is moving from the last driven pulley P-3 towards the braking means 35. Thus, the tensioning idler can engage the belt either between the third driven pulley P-3 and the driving pulley 8 or between the driving pulley and the braking means, but it should in any case engage the belt "upstream" from the braking means and "downstream" from the last driven pulley; and the braking means must engage the belt "downstream" from both the driving pulley 8 and the tensioning idler 27.

The belt tensioner 11 must be further so arranged that movement of its idler pulley 27 into engagement with the outer side of the belt does not interfere with automatic withdrawal of the belt from the groove 41 in the stationary brake member. To this end the tensioner bell crank 29 has its fulcrum pivot 30 so located in front of the belt stretch 34 that its lever arm 31, which carries the tensioning idler pulley 27, extends nearly straight rearward, and the idler pulley 27 moves for belt tensioning in a direction nearly lengthwise along the belt stretch 34 and in the direction away from the braking means 35.

Figure 3:
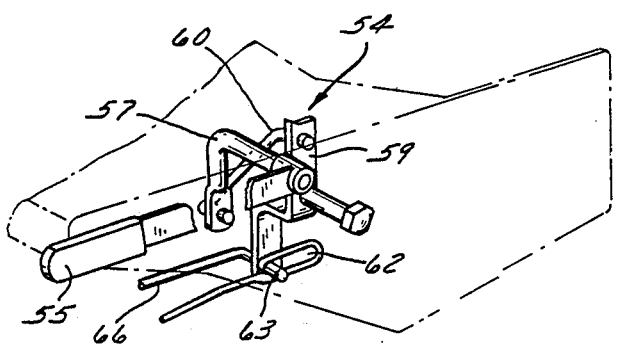
FIG. 3 is a detailed perspective view of the manually operable actuator shown in its "off" position in which mower blade braking takes place.
Figure 4:
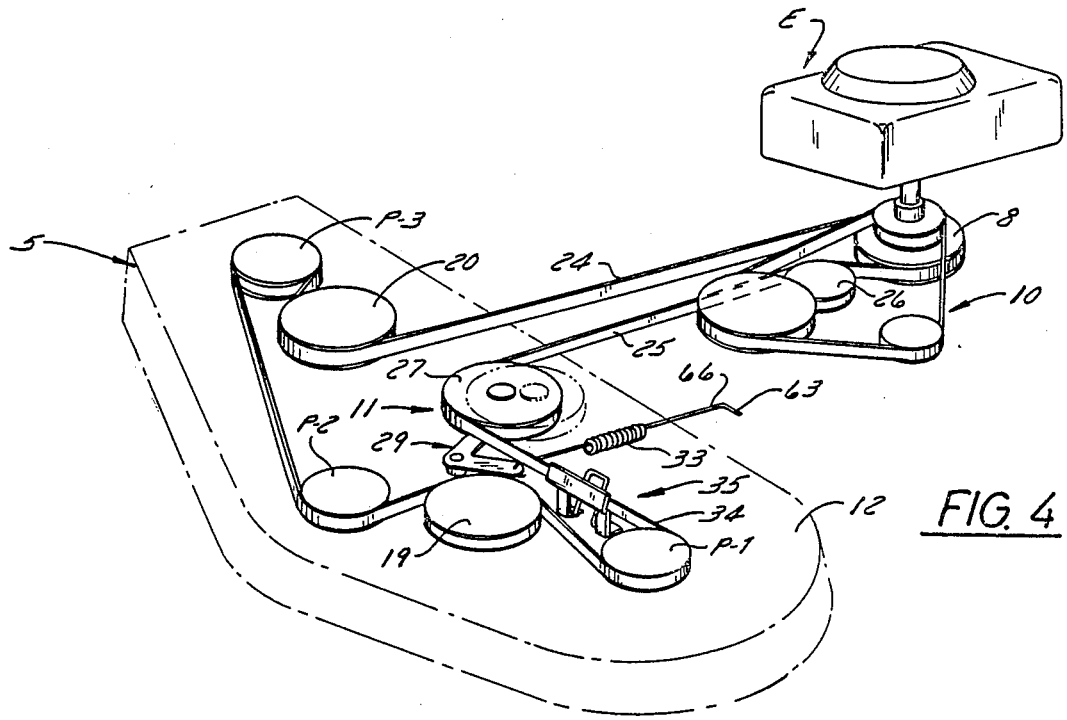
FIG. 4 is a diagrammatic perspective view of the transmission in its relationship to its driving pulley and the prime mover that powers the driving pulley.
Figure 5:
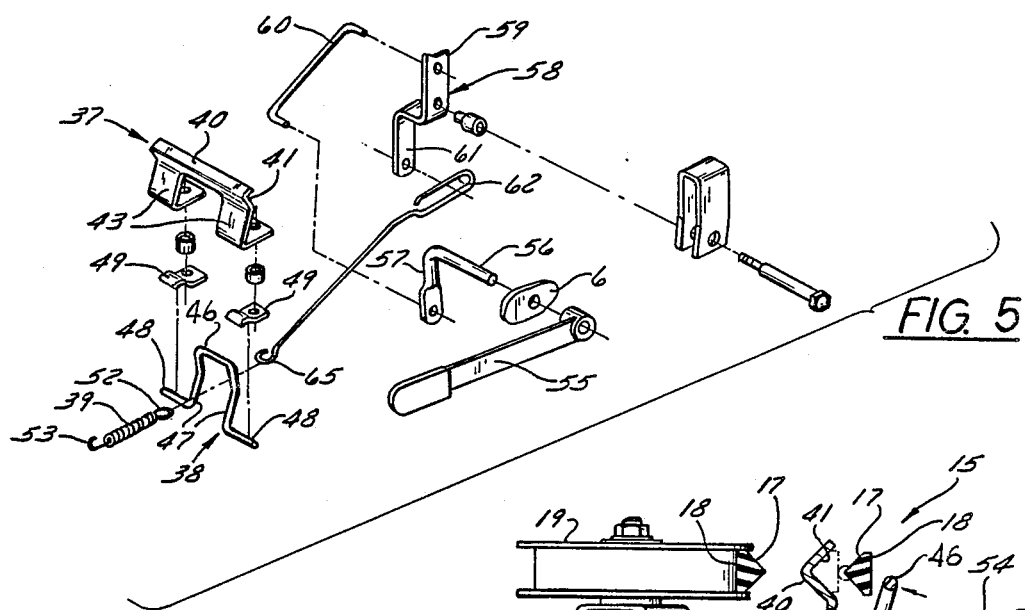
FIG. 5 is an exploded perspective view of the mower blade braking means and its connection to the actuator.

The other arm 32 of the tensioner bell crank extends substantially sideward from its fulcrum pivot 30, and the tensioning spring 33, which has a front end connected to that lever arm 32, extends rearward. At its rear end the tensioning spring 33 is connected to an actuator 54 that comprises a manually shiftable control arm 55. The arm 55 is swingable upward and rearward from its "off" position shown in FIG. 3, wherein the tensioning spring 33 is relaxed and the belt is consequently slack around the driving pulley 8, to an upright "on" position. For such swinging the control arm 55 pivots on a shaft 56 which is confined to rotation on the chassis 6 and from which a radial crank arm 57 extends downward when the control arm is in its "off" position. The actuator 54 further comprises a straight lever 58 which is medially fulcrumed on the chassis to swing about an axis which is parallel and near to that of the shaft 56. An upper arm 59 of the straight lever 58 is connected by means of a toggling link 60 with the crank arm 57, while the rear end of the tensioning spring 33 is connected to the lower arm 61 of the straight lever. Swinging the control arm 55 from its "off" position towards its "on" position causes the crank arm 57 to swing forward, and through the toggling link 60 the upper arm 59 of the straight lever 58 is thereby drawn forward, so that the lower arm 61 of that lever swings rearward to tension the spring 33. As the control arm 55 nears its "on" position, the toggling link 60 crosses the axis of the shaft 56 on which the control arm swings, and thereafter the reaction force of the tensioning spring so acts upon the control arm as to urge it the rest of the way to its "on" position, which is defined by an abutment.

The lost motion link 54 that has its front end connected with the movable brake member 38 has in its rear end portion an elongated slot 62. A pivot pin 63 on the lower arm 61 of the straight lever 58 is slidably received in that slot 62 to provide a lost motion connection between the link 54 and the straight lever. As the control arm 55 is moved through the final portion of its travel to its "on" position, the lost motion link 54 is drawn rearward simultaneously with tensioning of the belt tensioner spring 33, and the link 54 in turn draws the movable brake member 38 rearward to its inoperative position. Through the lost motion link 54 the biasing force of the brake spring 39 is applied to the straight lever 58 additively to the reaction force of the tensioning spring 33, contributing to the toggling force that releasably holds the control arm 55 in its "on" position wherein tension is maintained in both of those springs. It will be obvious that during swinging of the control arm to its "off" position the lost motion connection between the straight lever 58 and the lost motion link 54 allows the movable brake member to swing to its braking position, under bias of the brake spring 39, simultaneously with relief of tension in the belt tensioning spring 33.

As shown, the lost motion link 54 can be bent from a single piece of wire that has a small loop 65 at its front end which embraces a leg 47 of the movable brake member and has its rear end portion formed as an elongated loop which defines the slot 62. The belt tensioning spring 33 is connected to the straight lever by means of an L-shaped rod having a longer leg 66 which is connected at its front end to the tensioning spring and at the rear end of which there is a laterally projecting shorter leg that extends through a hole in the lower arm of the straight lever 58 and comprises the pivot pin 63 which is received in the slot 62 in the lost motion link.

From the foregoing description taken with the accompanying drawings, it will be apparent that this invention provides a power mower belt transmission which is especially suitable for a multi-blade mower, wherein the belt has good wrap around the driving and driven pulleys when the transmission is engaged and wherein simple, effective and very inexpensive braking means effects prompt arrest of blade rotation, without undue wear on the belt, as soon as the driving pulley is uncoupled from the driven pulleys.

What is claimed as the invention is:

1. In a mower transmission comprising a powered driving pulley, a driven pulley with which a blade is constrained to rotate, supporting means on which said pulleys are confined to rotation at a substantially fixed distance from one another, an endless belt trained around said pulleys and having a laterally tapering inner side that engages said pulleys and an opposite outer side, and a belt tensioner comprising an idler pulley and means comprising a manually operable actuator for shifting said idler pulley between an operative position wherein the idler pulley engages the side of the belt to tension it for driving and an inoperative position wherein the idler pulley is disengaged from the belt for slippage of the driving pulley relative to it, braking means for arresting rotation of said blade when the idler pulley is shifted to its inoperative position, said braking means comprising:

A. a stationary brake member mounted adjacent to a stretch of said belt which is between the idler pulley and the driven pulley and, during driving, moves away from the idler pulley and towards the driven pulley,
　　(1) said stationary brake member having an elongated upper friction portion mounted on the supporting means and presenting a surface against which the belt can be pressed and
　　(2) the upper friction portion of said stationary brake member being disposed lengthwise parallel to said stretch of the belt at a small distance from the side thereof;
　B. a movable brake member having an upper belt engaging portion and a lower portion;
　C. means pivotally mounting the lower portion of the brake member on the supporting means for swinging between
　　(1) a releasing position wherein the upper belt engaging portion is spaced from the side of the belt and
　　(2) a braking position wherein the belt engaging portion of the movable brake member engages the side of the belt to press said belt against the friction portion of the stationary brake member; and
　D. a linkage means connected between the movable brake member and said actuator whereby shifting of said idler pulley to its operative position swings the movable brake member to its releasing position and shifting of said idler pulley to its inoperative position will cause the movable brake member to swing to its braking position.

2. The mower transmission of claim 1 wherein said actuator comprises a control arm that is manually displaceable between defined "on" and "off" positions and a carrier on which said idler pulley is supported for rotation and for shifting between its said operative and inoperative positions, further characterized by:
　(1) a belt tensioning spring having one end connected with said carrier in tension and which biases said idler pulley to its operative position; and
　(2) means providing a toggling connection between said control arm and the other end of said belt tensioning spring whereby displacement of said control arm towards its "on" position tensions said belt tensioning spring and tension in that spring urges the control arm to its "on" position during a final stage of its displacement towards that position.

3. The mower transmission of claim 2 wherein said connection between the movable brake member and the actuator is a lost motion connection.

4. A mower transmission comprising a powered driving pulley, a plurality of driven pulleys with each of which a blade is constrained to rotate, supporting means on which said pulleys are confined to rotation at substantially fixed distances from one another, an endless belt which has a laterally tapering inner side for engaging each of said pulleys and an opposite outer side and which is trained around said pulleys for driving movement from the driving pulley to each of the driven pulleys in a succession from a first to a last of them and thence back to the driving pulley, a belt tensioner comprising an idler pulley confined to rotation on a carrier which is shiftable relative to the supporting means in opposite directions to be carried between an operative position wherein the idler pulley engages the belt to tension it for driving and an inoperative position wherein the idler pulley is disengaged from the belt for slippage of the driving pulley relative to it, and braking means for arresting rotation of said blades when the idler pulley is shifted to its inoperative position, said transmission being characterized by:

A. said belt tensioner being located and arranged for engagement of said idler pulley against the outer side of the belt at a portion thereof that moves for driving from said last to said first of the driven pulleys;

B. said braking means
  (1) being located on said supporting means adjacent to a stretch of the belt which, during driving,
    (a) is straight and
    (b) moves away from said driving pulley and said idler pulley and towards said first driven pulley, and
  (2) comprising cooperating stationary and movable braking members on said supporting means, one at each of said sides of the belt,
    (a) one of said braking members being at the inner side of the belt and having an elongated groove that extends parallel to said stretch and opens towards the same and wherein the belt is closely receivable,
    (b) the stationary braking member being fixed on said supporting means to be spaced a small distance from said stretch when the belt is driving, and
    (c) the movable braking member being confined to motion towards and from the stationary braking member between a releasing position in which the movable braking member is spaced from the belt and a braking position wherein the movable braking member laterally deflects said stretch and confines it in said groove under clampwise engagement between said members;

C. a braking spring connected between the supporting means and the movable braking member to bias the latter toward its braking position;

D. a tensioning spring having opposite ends, one of which is connected with said carrier for biasing the same to its operative position;

E. an actuator which is manually shiftable between defined "on" and "off" positions and which has a toggling connection with the other end of said tensioning spring whereby
  (1) shifting of said actuator towards its "on" position tensions that spring and
  (2) tension in the tensioning spring urges said actuator through a final stage of shifting to its "on" position; and F. means providing a lost motion connection between said actuator and the movable brake member whereby shifting of the actuator to its "on" position moves the movable brake member to its releasing position and shifting of the actuator towards its "off" position permits the movable brake member to move to its braking position under the bias of said braking spring.

5. The mower transmission of claim 4 wherein said stationary and movable brake members are mounted on an upper surface of said supporting means that is beneath said stretch of the belt, further characterized by:
  (1) said one brake member being the stationary brake member and being formed in one piece to have
    (a) an elongated upper friction portion that is bent along its length to define said groove and
    (b) an upright supporting portion bent to have at a lower end thereof a laterally projecting foot portion that overlies and is secured to said upper surface and an upper end of which is connected with said upper friction portion for supporting the same at the level of said stretch of the belt;
  (2) said movable brake member being bent from a single piece of wire to have
    (a) a substantially straight and horizontally extending bight portion,
    (b) a pair of legs that are bent downward from opposite ends of said bight portion, and
    (c) a pair of coaxial horizontally extending pivot portions, each bent from a lower end of one of said legs; and
  (3) means confining said pivot portions to rotation adjacent to said upper surface to provide for swinging of the movable brake member between its braking and releasing positions.

* * * * *